US010465942B2

(12) United States Patent
Shaffer et al.

(10) Patent No.: US 10,465,942 B2
(45) Date of Patent: Nov. 5, 2019

(54) INTEGRATED WATER HEATER

(71) Applicant: Haier US Appliance Solutions, Inc., Wilmington, DE (US)

(72) Inventors: Timothy Scott Shaffer, La Grange, KY (US); Gregory Leon Hutchison, Shelbyville, KY (US); Christopher Bryan Rissler, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 250 days.

(21) Appl. No.: 15/237,733

(22) Filed: Aug. 16, 2016

(65) Prior Publication Data

US 2018/0051908 A1 Feb. 22, 2018

(51) Int. Cl.
*F24H 8/00* (2006.01)
*F24H 1/18* (2006.01)
*F24H 4/04* (2006.01)
*F28D 1/06* (2006.01)
*F28D 20/00* (2006.01)

(52) U.S. Cl.
CPC ............. *F24H 1/182* (2013.01); *F24H 1/181* (2013.01); *F24H 1/183* (2013.01); *F24H 4/04* (2013.01); *F24H 8/006* (2013.01); *F28D 1/06* (2013.01); *F28D 20/0039* (2013.01); *F24D 2200/12* (2013.01); *F24D 2220/08* (2013.01); *Y02E 60/142* (2013.01)

(58) Field of Classification Search
USPC ........................................................ 122/15.1
See application file for complete search history.

(56) References Cited

U.S. PATENT DOCUMENTS

| 4,898,150 | A | 2/1990 | Lewis | |
|---|---|---|---|---|
| 5,137,053 | A * | 8/1992 | Kale | F24H 9/124 |
| | | | | 137/341 |
| 6,508,208 | B1 * | 1/2003 | Frasure | F24H 1/207 |
| | | | | 122/380 |
| 7,861,678 | B2 * | 1/2011 | McClellan | F22D 7/04 |
| | | | | 122/14.3 |
| 8,056,825 | B2 | 11/2011 | Otake et al. | |
| 9,777,889 | B2 * | 10/2017 | Leachman | F17C 3/04 |
| 2005/0269069 | A1 * | 12/2005 | Hancock | F28D 1/0473 |
| | | | | 165/179 |
| 2012/0060521 | A1 * | 3/2012 | Roetker | F24H 4/04 |
| | | | | 62/79 |
| 2016/0109155 | A1 * | 4/2016 | Rissler | F24H 4/04 |
| | | | | 62/324.1 |

FOREIGN PATENT DOCUMENTS

CN 100570234 C 12/2009

* cited by examiner

*Primary Examiner* — Steven B McAllister
*Assistant Examiner* — John E Bargero
(74) *Attorney, Agent, or Firm* — Dority & Manning, P.A.

(57) ABSTRACT

A water heater tank has several components formed of a one-piece seamless construction. The water heater tank includes a cylindrical wall with inner and outer surfaces. A helical condenser channel may be formed in the outer surface of the cylindrical wall. The water heater includes a cold water inlet. A cold water channel may be formed in the inner surface of the cylindrical wall in fluid communication with the cold water inlet and the interior volume of the tank.

18 Claims, 7 Drawing Sheets

INTEGRATED WATER HEATER

FIELD OF THE INVENTION

The present subject matter relates generally to water heaters, such as heat pump water heaters.

BACKGROUND OF THE INVENTION

Water heater appliances generally include a tank wrapped in insulation and enclosed within an outer shell. Typically, the tank can be formed of metal, such as steel, with an inner lining or coating such as glass or enamel. Such tanks include numerous attachment points and a variety of other pieces of the water heater appliance attached thereto. For example, fittings for supply of cold water, output of hot water, and various valves are typically each separately formed and connected to the tank, e.g., by welding or brazing. Additionally, assorted tubes are attached to the tank, such as a dip tube for introduction of cold water into the tank and a condenser tube wrapped around the outside of the tank. Connecting these various fittings and tubes to the tank using conventional methods requires additional steps and/or material, including but not limited to welding fittings to the tank walls or applying thermal interface material between the tank and the condenser tube.

Conventional dip tubes for water heater appliances are standard, straight pipes with open ends. These dip tubes deliver cold water to a lower portion of the tank, but, due to clearances and manufacturing tolerances, cannot directly reach the very lowest portion of the tank. Additionally, the open end of the dip tube pipe concentrates the outflow of cold water from the dip tube in a single location at a relatively high velocity.

In order to provide the required heat transfer to the tank, conventional condenser tubes may require one hundred feet of tubing or more to be wrapped around the tank. Heat is conductively transferred from the condenser tubes to the tank and ultimately to water stored inside the tank via contact between the condenser tube and the tank wall. Where the tube is round and the tank wall is planar, good contact, i.e., a sufficiently-sized contact area, can be difficult to achieve. Moreover, microscopic irregularities in the surfaces of the condenser tube and tank will create air pockets between the two, unless thermal interface material such as thermal paste is applied to bridge these gaps.

As such, there is a need for a water heater that can be more efficiently manufactured, as well as provide improved structures for cold water supply to the tank and thermal transfer between the tank and condenser.

BRIEF DESCRIPTION OF THE INVENTION

The present subject matter provides an integral water heater. Additional aspects and advantages of the invention will be set forth in part in the following description, or may be apparent from the description, or may be learned through practice of the invention.

In a first exemplary embodiment, a water heater tank is provided. The water heater tank defines axial, circumferential, and radial directions. The water heater tank includes a top end wall, a bottom end wall spaced from the top end wall along the axial direction, and a cylindrical wall extending along the axial direction between the top end wall and the bottom end wall. The cylindrical wall having an inner surface extending along the axial direction and an outer surface parallel to the inner surface and spaced from the inner surface along the radial direction. The water heater tank also includes a helical condenser channel formed in the cylindrical wall proximate the outer surface of the cylindrical wall, wherein the top end wall, the bottom end wall, the cylindrical wall and the condenser channel are formed of a one-piece seamless construction.

In a second exemplary embodiment, a water heater tank is provided. The water heater tank defines axial, circumferential, and radial directions. The water heater tank includes a top end wall, a bottom end wall spaced from the top end wall along the axial direction, a cylindrical wall extending along the axial direction between the top end wall and the bottom end wall, the cylindrical wall having an inner surface extending along the axial direction and an outer surface parallel to the inner surface and spaced from the inner surface along the radial direction, an interior volume defined by the top end wall, the bottom end wall, and the inner surface of the cylindrical wall, a cold water inlet, and a cold water channel formed in the cylindrical wall proximate the inner surface of the cylindrical wall, the cold water channel in fluid communication with the cold water inlet, the cold water channel comprising at least one opening in fluid communication with the interior volume of the tank, wherein the top end wall, the bottom end wall, the cylindrical wall, the cold water inlet, and the cold water channel are formed of a one-piece seamless construction.

In a third exemplary embodiment, a method of making a water heater tank is provided. The water heater tank defines axial, circumferential, and radial directions. The method includes forming a tank having a top end wall, a bottom end wall spaced from the top end wall, a cylindrical wall extending between the top end wall and the bottom end wall, the cylindrical wall having an inner surface and an outer surface parallel to the inner surface and spaced from the inner surface, an interior volume defined by the top end wall, the bottom end wall, and the inner surface of the cylindrical wall, forming a hot water outlet in the top end of the tank and in fluid communication with the interior volume of the tank, forming a cold water inlet extending into the interior volume of the tank from outside of the tank, forming a cold water channel in fluid communication with the cold water inlet, the cold water channel having at least one opening in fluid communication with the interior volume, forming a helical condenser channel in the cylindrical wall proximate the outer surface of the cylindrical wall, forming a fitting for connecting a temperature and pressure relief valve, and forming a drain port proximate the bottom end of the tank, wherein each of the forming steps is performed simultaneously with every other forming step, whereby the top end, bottom end, cylindrical wall, hot water outlet, cold water inlet, cold water channel, helical condenser channel, fitting, and drain port are formed as a single seamless piece.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
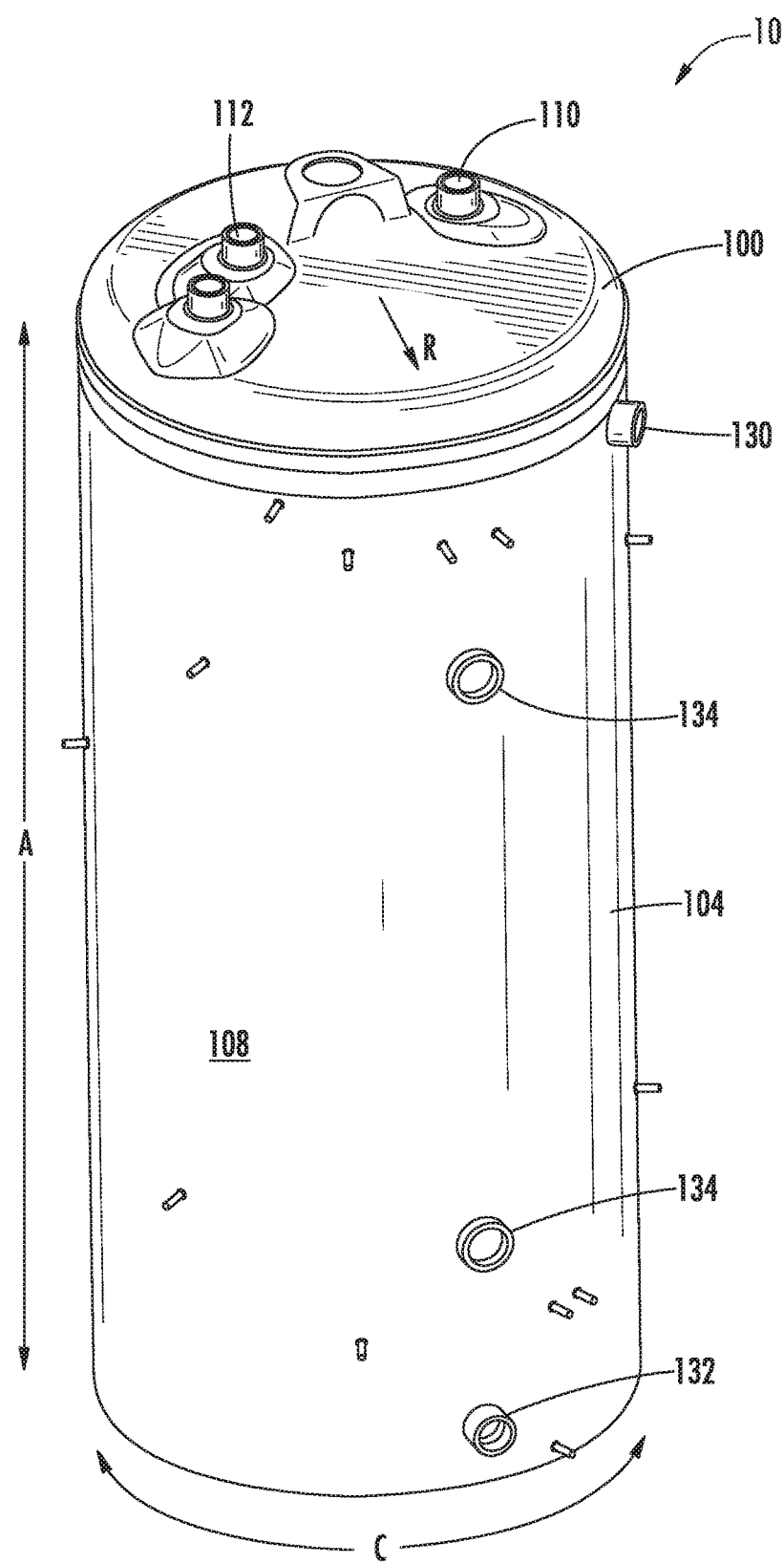
FIG. 1 provides an elevation view of a water heater tank according to at least one exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Although exemplary embodiments of the present disclosure will be described generally in the context of a water heater appliance for purposes of illustration, one of ordinary skill in the art will readily appreciate that embodiments of the present disclosure may be applied to any style or type of heater for a liquid and are not limited to water heaters or heating systems for water.

As may be seen in, e.g., FIG. 1, water heater tank 10 defines axial direction A, circumferential direction C, and radial direction R. The axial direction A is substantially parallel to a longitudinal axis of tank 10. The circumferential direction C refers to the relative direction that extends around the longitudinal axis of tank 10. The radial direction refers to the relative direction that is substantially perpendicular to the longitudinal axis of tank 10.

The various components of water heater tank 10 may be formed of a one-piece, seamless construction, as will be discussed in more detail in the following with regard to several illustrative examples. A one-piece seamless tank 10 may be constructed by additive manufacturing. For example, various 3D-printing techniques may be used, such as but not limited to selective laser sintering or direct metal laser melting. The present subject matter is not limited to any particular manufacturing technique, but is instead intended to apply to any suitable technique to produce the water heater tank 10 described herein. Thus, tank 10 may be constructed of a single, continuous piece of material, such as metal or plastic, in certain exemplary embodiments.

As illustrated in the exemplary embodiment of FIG. 1, water heater tank 10 may include a top end wall 100, a bottom end wall 102 (see, e.g., FIG. 2) spaced from the top end wall 100 along axial direction A, and a cylindrical wall 104 extending along axial direction A between the top end wall 100 and the bottom end wall 102. Top end wall 100, bottom end wall 102, and cylindrical wall 104 may be formed of a one-piece seamless construction. Some exemplary embodiments of tank 10, and in particular cylindrical wall 104 thereof, may also include various ports, inlets, and other fittings for connecting, e.g., pipes and valves, thereto. For example as illustrated in FIG. 1, some exemplary embodiments of tank 10 may include a fitting 130 in the cylindrical wall 104 for connecting a temperature and pressure relief valve (not shown), along with a drain port 132 and one or more fittings 134 for mounting resistance heating elements (not shown) in tank 10, all of which may be incorporated into tank 10, e.g., in the cylindrical wall 104. Additional fittings such as cold water inlet 110 and hot water outlet 112 may be provided in some embodiments, e.g., in top end wall 100 as illustrated in FIG. 1. In at least some embodiments, any or all of the foregoing ports, fittings, etc. may be incorporated into tank 10, e.g., by forming the fittings as a one-piece seamless construction with tank 10.

Figure 2:
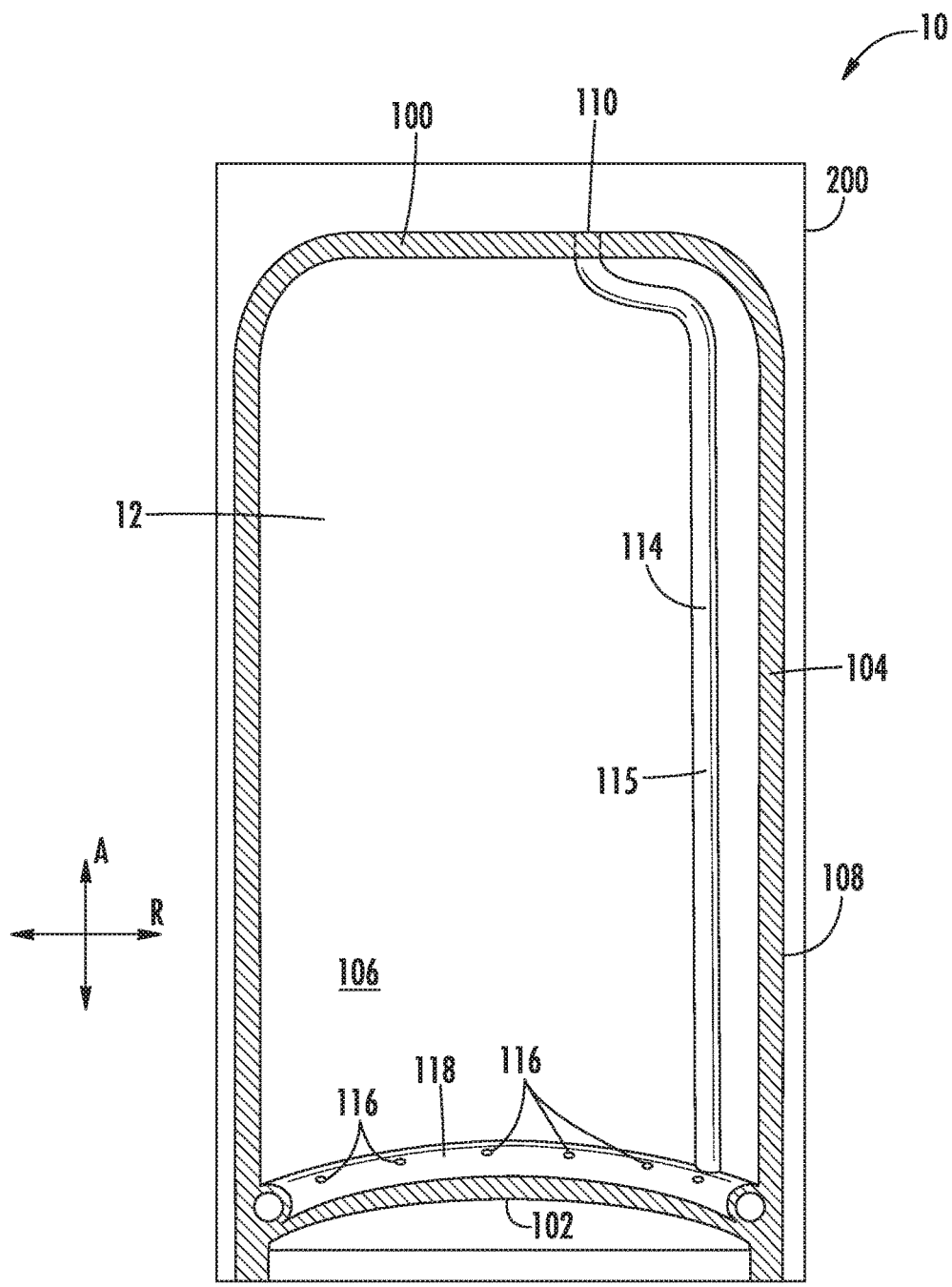
FIG. 2 provides a section view of a water heater appliance tank according to an exemplary embodiment of the present subject matter.

As illustrated in the exemplary embodiment of FIG. 2, the cylindrical wall 104 includes an inner surface 106 and an outer surface 108 parallel to the inner surface 106, e.g., such that the inner surface 106 and outer surface 108 are spaced apart along the radial direction R. The tank 10 may further include an interior volume 12 defined by the top end wall 100, the bottom end wall 102, and the inner surface 106 of the cylindrical wall 104, for example as illustrated in FIG. 2. Interior volume 12 of tank 10 can be adapted for storing potable water. As may be seen, e.g., in FIG. 2, a water heater appliance may comprise an outer wrapper or shell 200 around tank 10, with insulation (not shown) disposed between tank 10 and shell 200.

Tank 10 includes cold water inlet 110 and hot water outlet 112, as illustrated in the exemplary embodiment of FIG. 1, each in the top end wall 100 and each adapted for connection to the plumbing system of a building such as a residence. Cold water inlet 110 and hot water outlet 112 may be formed of a one-piece seamless construction with tank 10, e.g., in top end wall 100. Cold water inlet 110 is adapted for connection to a pipe supplying water in an initial non-heated, i.e., "cold," state, e.g., as supplied from the water supply line of a home or other building. To that end, cold water channel 114 may be formed in the cylindrical wall 104, e.g., proximate to the inner surface 106, such that cold water channel 114 and cylindrical wall 104 comprise a one-piece seamless construction. Cold water inlet 110 may be in fluid communication with cold water channel 114 which may extend into interior volume 12 of tank 10 to supply cold water thereto.

Figure 3:
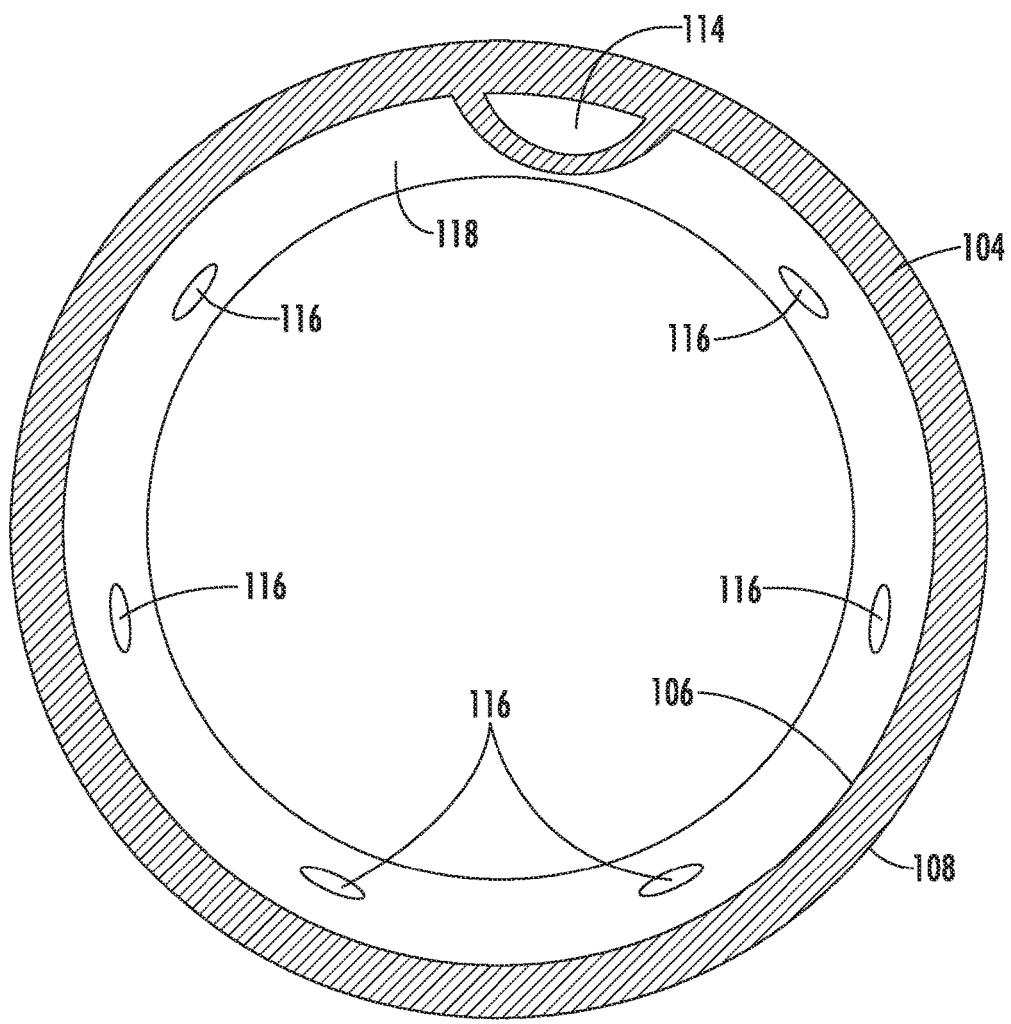
FIG. 3 provides a plan view of a water heater appliance tank according to an exemplary embodiment of the present subject matter.
Figure 5:
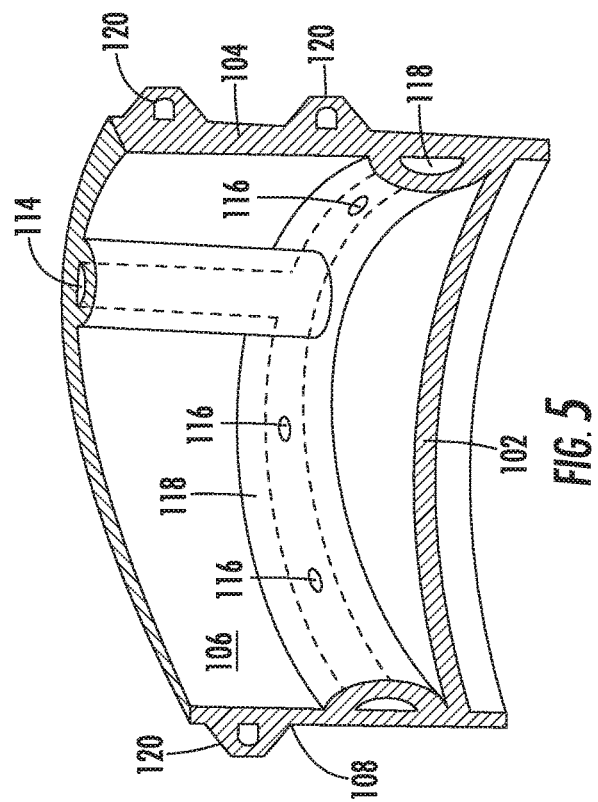
FIG. 5 provides a partial perspective view of a cold water channel according to an exemplary embodiment of the present subject matter.
Figure 4:
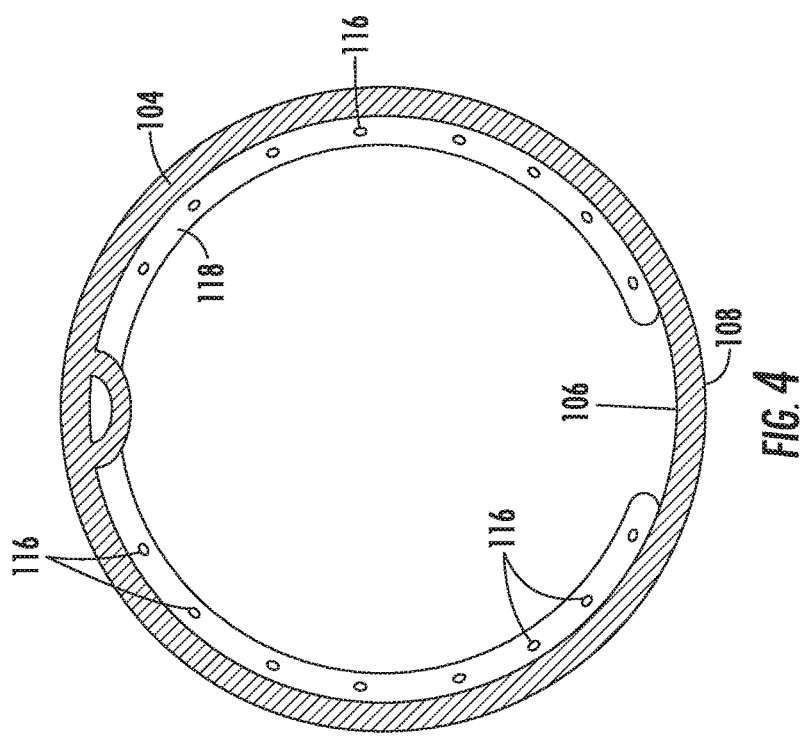
FIG. 4 provides a plan view of a water heater appliance tank according to an exemplary embodiment of the present subject matter.

Cold water channel 114 may, in some exemplary embodiments, terminate in an open end (not shown) with a single opening 116 to deliver cold water into interior volume 12 of tank 10. Preferably, cold water supplied to tank 10 can be delivered from opening(s) 116 to a lower portion of the tank 10, e.g., proximate to bottom end wall 102. In some exemplary embodiments, cold water channel 114 may include a circumferential portion 118 that extends at least partially around the circumference of the tank 10 at or near the intersection of bottom end wall 102 and cylindrical wall 104, for example as illustrated in FIGS. 3, 4, and 5. In some exemplary embodiments, such as in the exemplary embodiment illustrated in FIG. 3, the circumferential portion 118 may form a complete annular ring 118 around the circumference of the tank 10 proximate to bottom end wall 102. In some other exemplary embodiments, an example of which is illustrated in FIG. 4, cold water channel 112 may include a circumferential portion that extends only partially around the lower circumference of tank 10. In exemplary embodiments where cold water channel 114 includes circumferential portion 118, it is possible to provide a plurality of openings 116 spaced along the circumferential portion 118 of the cold water channel 114, e.g., as illustrated in FIGS. 2 through 5. In such exemplary embodiments, the cold water entering tank 10 can be distributed relatively equally around the circumference of tank 10, to avoid creating a single cold spot in tank 10. Also, such exemplary embodiments provide a relatively low velocity for the inflowing cold water, which helps to avoid or minimize vertical mixing of water within tank 10. Such exemplary embodiments promote advantageous vertical thermal stratification, e.g., hotter water is provided proximate to top end wall 100 and in particular hot water outlet 112, which can permit supply of more desirable, higher-temperature water to the user.

As illustrated in FIG. 2, in some exemplary embodiments, the cold water channel 114 further comprises an axial portion 115 extending between the cold water inlet 110 and the circumferential portion 118 of the cold water channel 114. In the exemplary embodiment of FIG. 2, the cold water channel 114, and in particular axial portion 115 thereof, extends along the inner surface 106 of cylindrical wall 104.

In some embodiments, such as the exemplary embodiments illustrated in FIGS. 6-9, tank 10 may comprise a part of a split-system water heater appliance (not shown) which includes a heat pump or other external heat source (also not shown), wherein heat from the external heat source is supplied to the water in tank 10 via fluid circulated through condenser channel 120 around the outside of tank 10, e.g., in or proximate to outer surface 108 of cylindrical wall 104.

Figure 6:
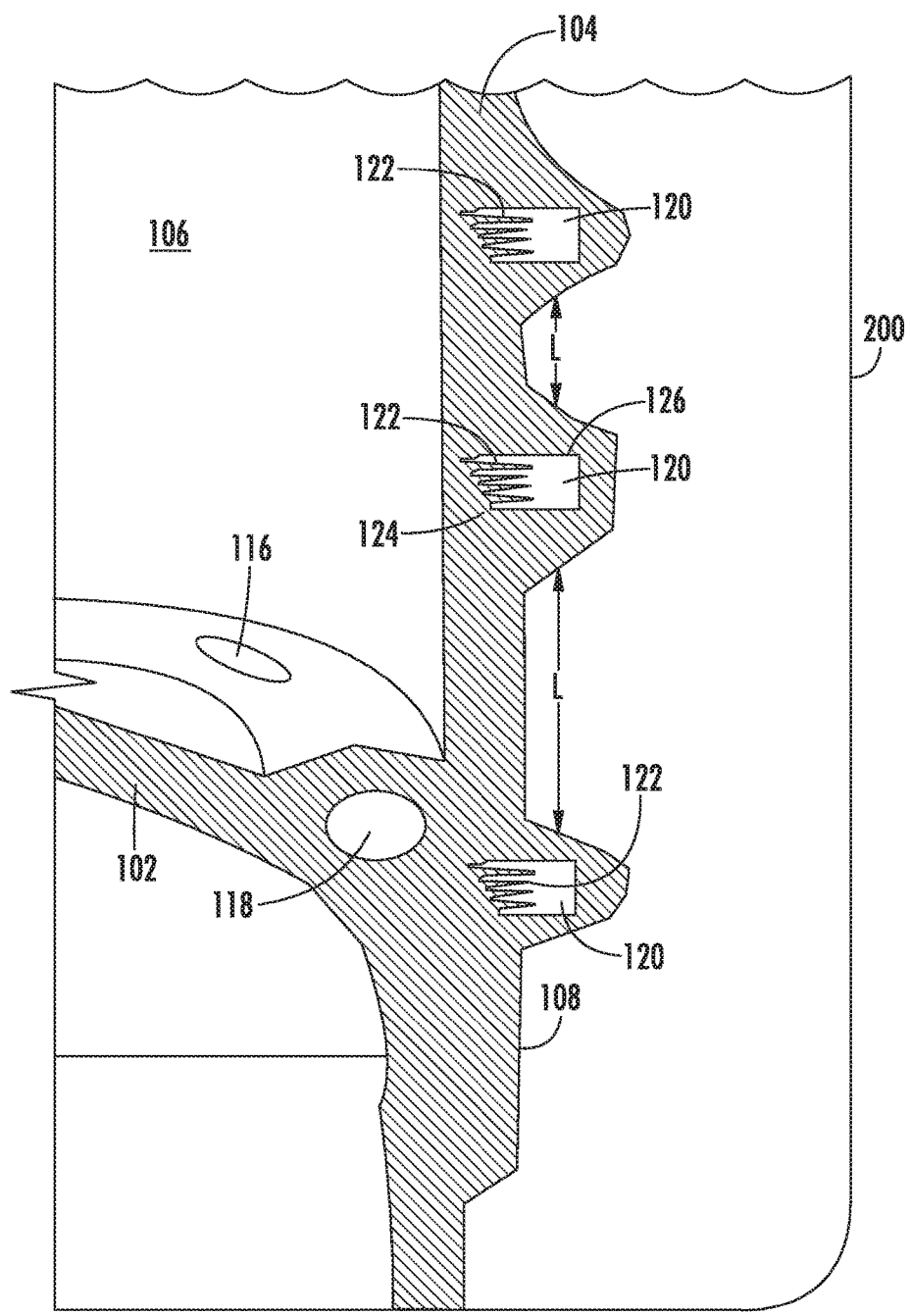
FIG. 6 provides a partial section view of a tank with a condenser channel according to an exemplary embodiment of the present subject matter.
Figure 7:
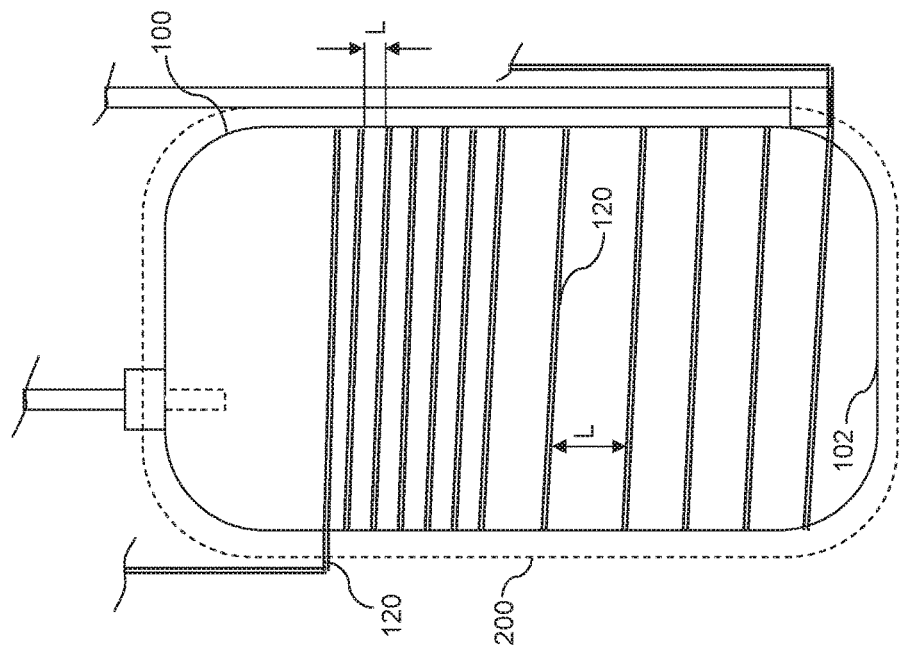
FIG. 7 provides a schematic illustration of a tank with a condenser channel according to an exemplary embodiment of the present subject matter.
Figure 8:
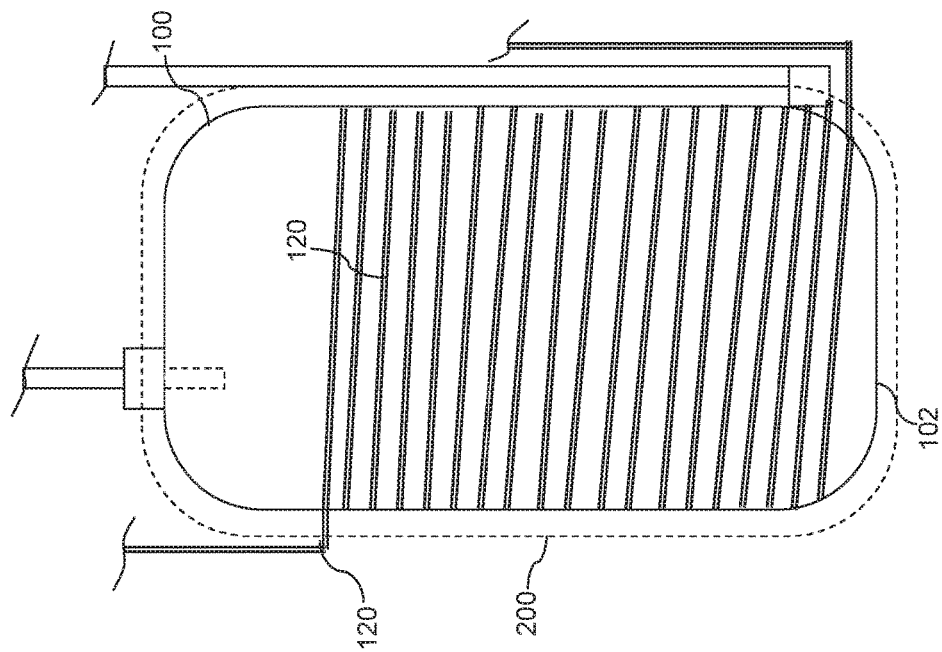
FIG. 8 provides a schematic illustration of a tank with a condenser channel according to an exemplary embodiment of the present subject matter.
Figure 9:
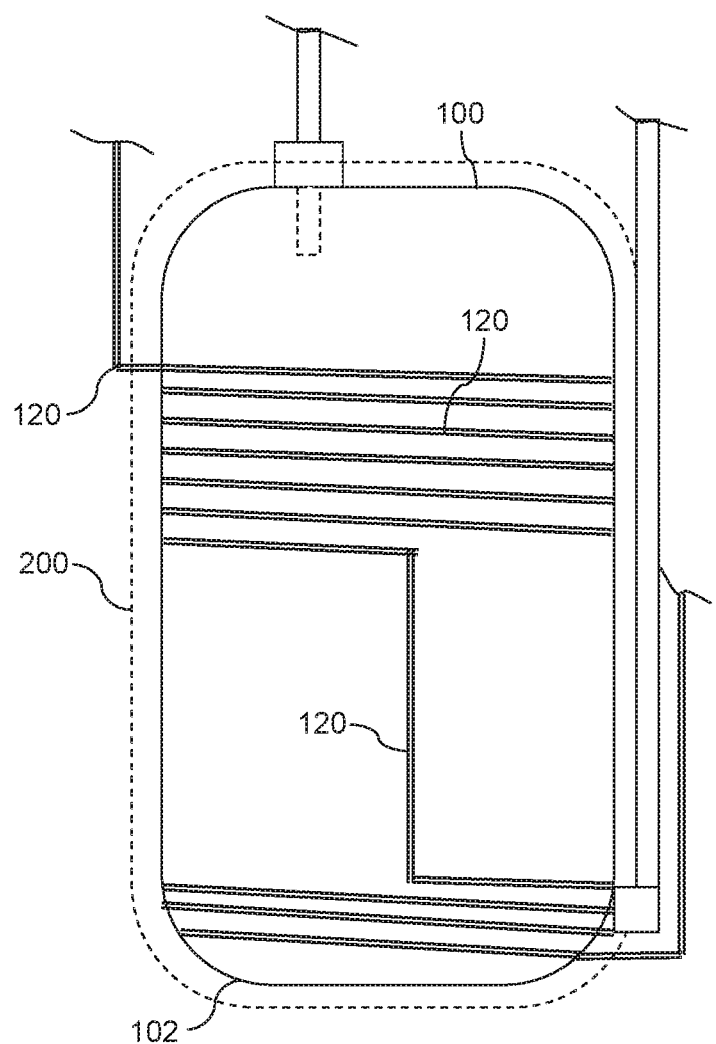
FIG. 9 provides a schematic illustration of a tank with a condenser channel according to an exemplary embodiment of the present subject matter.

As illustrated in, for example, FIG. 6, some exemplary embodiments may include a helical condenser channel 120 formed within cylindrical wall 104, e.g., proximate to outer surface 108, such that condenser channel 120 and cylindrical wall 104 comprise a one-piece seamless construction. Condenser channel 120 forms a helix with several loops as it extends around the outer surface 108 of tank 10. Various exemplary helical patterns are illustrated in FIGS. 7-9. As noted, e.g., in FIG. 6, adjacent loops of the helical pattern formed by condenser channel 120 are spaced apart a distance L along the axial direction A. The distance L may be a predetermined distance. In various embodiments, the distance L between adjacent loops of the condenser channel may be the same throughout, e.g., as illustrated in FIG. 7, or the distance L may decrease near the top end wall 100, e.g., as illustrated in FIG. 8, and/or multiple distinct zones may be created, e.g., as illustrated in FIG. 9. The ability to space the adjacent loops of condenser channel 120 closer together in certain areas of the tank can provide increased or concentrated heating in those specific areas. It will be understood that the closer the loops are together, i.e., the smaller predetermined distance L is, the more thermal energy will be transferred into interior volume 12. Thus, thermal stratification within tank 10 can be provided or enhanced by selective spacing of the loops, e.g., to define hotter zone(s) at or near a top portion of tank 10 proximate to top end wall 100 and hot water outlet 112. For example, as illustrated in FIGS. 8 and 9, the loops of condenser channel 120 may be more closely spaced near the top end wall 100 of tank 10.

There are numerous advantages to forming the condenser channel 120 integrally with cylindrical wall 104. For example, the shape and location of the condenser channel 120 can be precisely controlled rather than being constrained by properties of a separate, pre-formed tube. In some exemplary embodiments, for example, as illustrated in FIG. 6, tank 10 may include condenser channel 120 with a cross-section, e.g., in a plane that is perpendicular to the circumferential direction C, having a first portion 124 extending along the axial direction A and a second portion 126 extending outward from the first portion, e.g., along the radial direction R. The first portion 124 being closer to interior volume 12 of tank 10 permits features to be provided thereon which can enhance thermal transfer from condenser channel 120 into stored fluid, e.g., water, in the interior volume 12. As an example of such features, some exemplary embodiments may further include a plurality of fins 122 extending outward along the radial direction R from the first portion 124, such as the exemplary embodiment illustrated in FIG. 6. Fins 122 provide increased surface area for fluid within condenser channel 120 to contact the cylindrical wall 104 with a minimal amount of material between the fluid in condenser channel 120 and the fluid in the interior volume 12 to provide improved thermal transfer between the fluids, e.g., heating water in interior volume 12 of tank 10. Similar fins may also be provided on the interior surface 106 of cylindrical wall 104, e.g., in corresponding locations to the fins 122 to further enhance thermal transfer between condenser channel 120 and interior volume 12.

As a result of forming the condenser channel 120 in a one-piece seamless construction with the cylindrical wall 104, discontinuities such as microscopic surface irregularities between the condenser channel 120 and cylindrical wall 104 are eliminated. In other words, because the two components are formed as one piece, there are no external contact surfaces. Thus, thermal transfer between condenser channel 120 and internal volume 12 is improved. As a result of the improved thermal transfer, the overall length of the condenser channel 120 can be shorter than would be required if a separate condenser tube were used. This results in reduced material requirements and more efficient manufacturing of tank 10. The foregoing advantages are provided as examples only and without limitation. Additional advantages exist as would be appreciated by those skilled in the art.

Throughout this disclosure, features illustrated or described as part of one embodiment can be used with another embodiment to yield a still further embodiment. For example, a condenser channel 120 such as that illustrated for example in FIG. 6 may also be provided on the exemplary tank 10 illustrated in FIG. 2. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater tank defining axial, circumferential, and radial directions, the water heater tank comprising:

a top end wall;
a bottom end wall spaced from the top end wall along the axial direction;
a cylindrical wall extending along the axial direction between the top end wall and the bottom end wall, the cylindrical wall comprising an inner surface extending along the axial direction and an outer surface generally parallel to the inner surface and spaced from the inner surface along the radial direction;
a helical condenser channel formed in the cylindrical wall proximate the outer surface of the cylindrical wall;
a cold water inlet;
a cold water channel formed in the cylindrical wall proximate the inner surface of the cylindrical wall, the cold water channel in fluid communication with the cold water inlet, the cold water channel comprising a complete annular ring spanning an intersection of the bottom end wall of the tank with the inner surface of the cylindrical wall and extending fully around the circumference of the water heater tank, the cold water channel further comprising a plurality of openings in fluid communication with the interior volume of the tank spaced along the annular ring;
wherein the top end wall, the bottom end wall, the cylindrical wall, the condenser channel, the cold water inlet, and the cold water channel are formed of a one-piece seamless construction.

2. The water heater tank of claim 1, wherein a cross-section of the condenser channel comprises a first portion positioned proximate the inner surface and a second portion extending along the radial direction from the first portion.

3. The water heater tank of claim 2, the condenser channel further comprising a plurality of fins extending outward along the radial direction from the first portion.

4. The water heater tank of claim 3, wherein the helical condenser channel forms a helix having loops spaced apart a predetermined distance along the axial direction and wherein the predetermined distance between adjacent loops of the helical condenser channel along the axial direction decreases towards the top end wall of the tank.

5. A water heater tank defining axial, circumferential, and radial directions, the water heater tank comprising:
a top end wall;
a bottom end wall spaced from the top end wall along the axial direction;
a cylindrical wall extending along the axial direction between the top end wall and the bottom end wall, the cylindrical wall comprising an inner surface extending along the axial direction and an outer surface generally parallel to the inner surface and spaced from the inner surface along the radial direction;
an interior volume defined by the top end wall, the bottom end wall, and the inner surface of the cylindrical wall;
a cold water inlet; and
a cold water channel formed in the cylindrical wall proximate the inner surface of the cylindrical wall, the cold water channel in fluid communication with the cold water inlet, the cold water channel comprising a complete annular ring spanning an intersection of the bottom end wall of the tank with the inner surface of the cylindrical wall and extending fully around the circumference of the water heater tank, the cold water channel further comprising a plurality of openings in fluid communication with the interior volume of the tank spaced along the annular ring;
wherein the top end wall, the bottom end wall, the cylindrical wall, the cold water inlet, and the cold water channel are formed of a one-piece seamless construction.

6. The water heater tank of claim 5, wherein the cold water channel extends along the inner surface of the cylindrical wall.

7. The water heater tank of claim 5, wherein the cold water channel further comprises an axial portion extending between the cold water inlet and the complete annular ring of the cold water channel.

8. The water heater tank of claim 5, further comprising a hot water outlet in the top end wall, a fitting in the cylindrical wall for connecting a temperature and pressure relief valve, and a drain port in the cylindrical wall, wherein the hot water outlet, the fitting, and the drain port are formed of a one-piece seamless construction with the top end wall, the bottom end wall, the cylindrical wall, the cold water inlet, and the cold water channel.

9. The water heater tank of claim 5, further comprising a helical condenser channel formed in the cylindrical wall proximate the outer surface of the cylindrical wall, wherein the helical condenser channel is formed of a one-piece seamless construction with the top end wall, the bottom end wall, the cylindrical wall, the cold water inlet, and the cold water channel.

10. A method of making a water heater tank, the water heater tank defining axial, circumferential, and radial directions, the method comprising:
forming a tank comprising a top end wall, a bottom end wall spaced from the top end wall, a cylindrical wall extending between the top end wall and the bottom end wall, the cylindrical wall comprising an inner surface and an outer surface generally parallel to the inner surface and spaced from the inner surface, an interior volume defined by the top end wall, the bottom end wall, and the inner surface of the cylindrical wall;
forming a hot water outlet in the top end wall of the tank and in fluid communication with the interior volume of the tank;
forming a cold water inlet extending into the interior volume of the tank from outside of the tank;
forming a cold water channel in fluid communication with the cold water inlet, the cold water channel comprising a complete annular ring spanning an intersection of the bottom end wall of the tank with the inner surface of the cylindrical wall and extending fully around the circumference of the water heater tank, the cold water channel further comprising a plurality of openings in fluid communication with the interior volume spaced along the annular ring;
forming a helical condenser channel in the cylindrical wall proximate the outer surface of the cylindrical wall;
forming a fitting for connecting a temperature and pressure relief valve; and
forming a drain port proximate the bottom end of the tank;
wherein the steps of forming the tank, forming the hot water outlet in the top end wall of the tank, forming the cold water inlet, forming the cold water channel, forming the helical condenser, forming the fitting, and forming the drain port are performed concurrently;
whereby each of the forming steps is performed such that the top end wall, bottom end wall, cylindrical wall, hot water outlet, cold water inlet, cold water channel, helical condenser channel, fitting, and drain port are formed as a single seamless piece.

11. The method of claim 10, wherein said step of forming a cold water channel further comprises forming an axial portion of the cold water channel along the inner surface of the cylindrical wall.

12. The method of claim 10, wherein said step of forming a cold water channel further comprises forming an axial portion extending between the cold water inlet and the complete annular ring of the cold water channel.

13. The method of claim 10, wherein said step of forming a condenser channel further comprises forming the condenser channel with a cross-section comprising a first portion extending along the axial direction and a second portion extending outward from the first portion.

14. The method of claim 13, wherein said step of forming a condenser channel further comprises forming a plurality of fins extending outward along the radial direction from the first portion.

15. The method of claim 10, wherein said step of forming a helical condenser channel further comprises forming a helix having loops spaced apart a predetermined distance along the axial direction, and wherein the predetermined distance between loops of the helical condenser channel along the axial direction decreases towards the top end wall of the tank.

16. The water heater tank of claim 1, wherein the plurality of openings of the cold water channel are equally sized.

17. The water heater tank of claim 5, wherein the plurality of openings of the cold water channel are equally sized.

18. The method of claim 10, wherein the step of forming the cold water channel further comprises forming the plurality of openings such that each opening of the plurality of openings is of equal size as every other opening of the plurality of openings.

* * * * *